US012732355B2

(12) United States Patent
Balin et al.

(10) Patent No.: US 12,732,355 B2
(45) Date of Patent: Sep. 8, 2026

(54) DISTRIBUTED MANAGEMENT OF BLUEPRINTS

(71) Applicant: Dell Products L.P., Round Rock, TX (US)

(72) Inventors: Maxim Balin, Gan-Yavne (IL); Shree Rathinasamy, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 163 days.

(21) Appl. No.: 18/901,129

(22) Filed: Sep. 30, 2024

(65) Prior Publication Data

US 2026/0095314 A1 Apr. 2, 2026

(51) Int. Cl.
*H04L 9/08* (2006.01)

(52) U.S. Cl.
CPC ............ *H04L 9/0861* (2013.01); *H04L 9/085* (2013.01)

(58) Field of Classification Search
None
See application file for complete search history.

(56) References Cited

U.S. PATENT DOCUMENTS 6,931,128 B2 * 8/2005 Roberts ................ H04L 9/0869 380/278
7,792,300 B1 * 9/2010 Caronni ................ H04L 9/0825 380/263
2014/0250303 A1 * 9/2014 Miller .................. G06F 21/602 713/171
2023/0035317 A1 * 2/2023 Jufer .................... G06F 21/335

FOREIGN PATENT DOCUMENTS

WO WO-2016115633 A1 * 7/2016 ........... H04L 9/3247
WO WO-2021048377 A1 * 3/2021 ........... H04L 9/0891

OTHER PUBLICATIONS

Bissoli et al., "Authentication as a service: Shamir Secret Sharing with byzantine components" (Jun. 19, 2018) (Year: 2018).*

* cited by examiner

*Primary Examiner* — Paul R Fisher

(74) *Attorney, Agent, or Firm* — WOMBLE BOND DICKINSON (US) LLP

(57) ABSTRACT

Methods and systems for managing operation of a deployment are disclosed. The operation may be managed by securing a blueprint using a consensus from stakeholder devices. The consensus may be obtained by sending, by the stakeholder devices, shares of a secret key to an edge management system. The secret key may be used to decrypt an encrypted copy of the blueprint. A sufficient quantity of the shares may be a minimum number of the shares to generate the secret key. Once the secret key is generated, the encrypted copy of the blueprint may be decrypted to generate the blueprint. The blueprint may then be deployed to a data processing system of the deployment.

20 Claims, 9 Drawing Sheets

DISTRIBUTED MANAGEMENT OF BLUEPRINTS

FIELD

Embodiments disclosed herein relate generally to managing operation of a deployment. More particularly, embodiments disclosed herein relate to securing blueprints through consensus.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
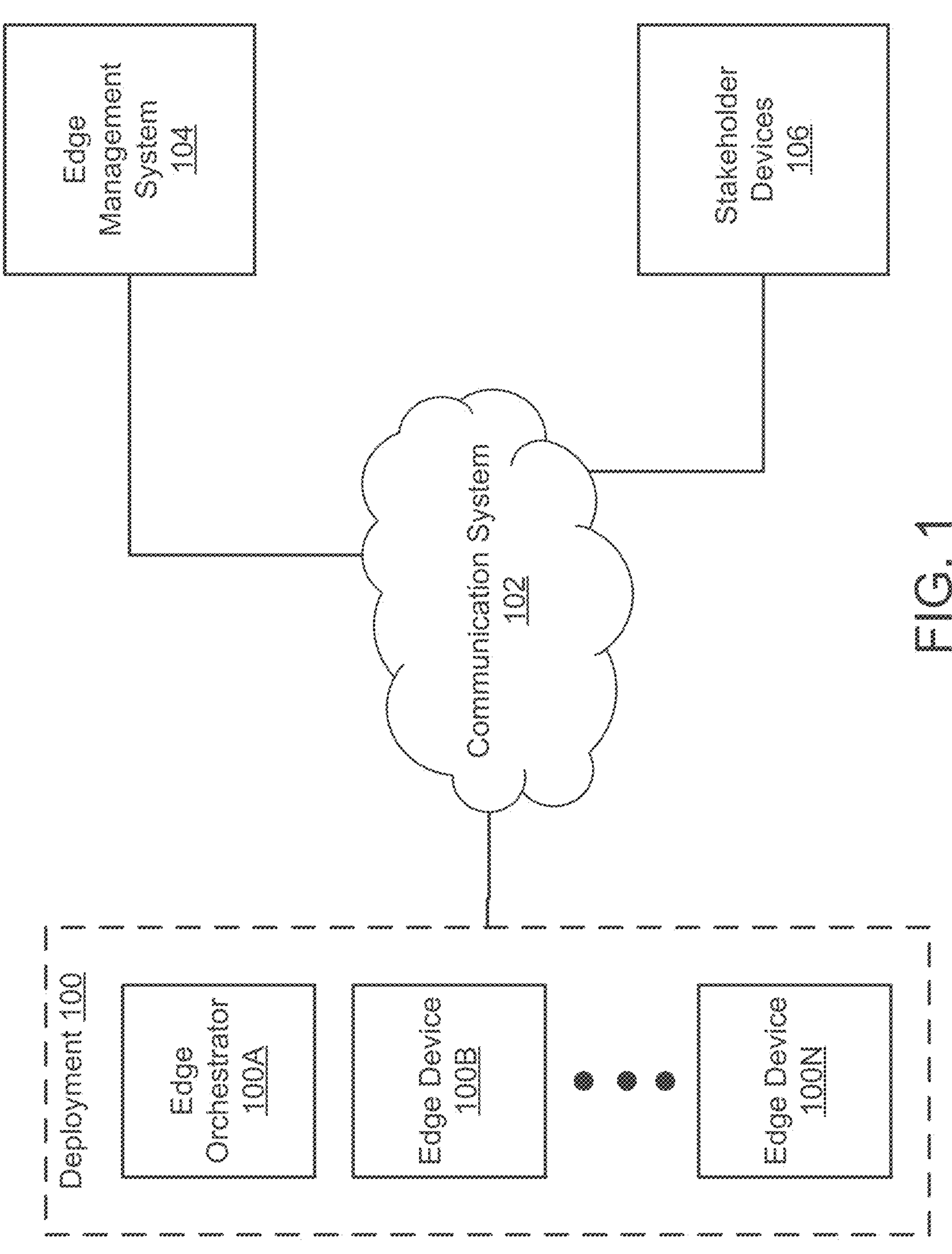
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to “one embodiment” or “an embodiment” means that a particular feature, structure, or characteristic described in conjunction with the embodiment can be included in at least one embodiment. The appearances of the phrases “in one embodiment” and “an embodiment” in various places in the specification do not necessarily all refer to the same embodiment.

References to an “operable connection” or “operably connected” means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of a deployment. The operation may be managed by securing a blueprint for a data processing system of the deployment. The blueprint may be secured by encrypting the blueprint and distributing secret management of shares of a secret key that is used to encrypt the blueprint.

The shares may be secretly managed by storing, by stakeholders of the blueprint, the shares on stakeholder devices. The shares may be portions of a secret key that are used to encrypt and/or decrypt the blueprint. The secret key, when generated by the shares, may be used to decrypt an encrypted copy of the blueprint for the deployment.

A sufficient quantity of the shares may be needed to generate the secret key. If the sufficient quantity of shares had been sent by the stakeholder devices to the edge management system, the secret key may be generated. If the secret key can be generated, the encrypted copy of the blueprint may be decrypted to generate the blueprint. Once the blueprint has been generated, the blueprint may be deployed to a data processing system.

In an embodiment, a method for managing operation of a deployment is disclosed. The method may include (i) identifying an occurrence of a blueprint use event with respect to at least one data processing system of the deployment; (ii) identifying, based on the occurrence, a shared secret usable to decrypt an encrypted copy of the blueprint; (iii) generating, based at least on the shared secret and a blueprint security standard for the encrypted copy of the blueprint, a number of requests for access to shares of the shared secret; (iv) distributing the number of the requests to stakeholder devices to attempt to obtain a sufficient quantity of the shares of the shared secret to facilitate reconstruction of the shared secret; (v) in an instance of the distributing where the stakeholder devices provide the sufficient quantity of the shares of the shared secret: (a) reconstructing the shared secret using the sufficient quantity of shares of the shared secret; (b) decrypting the encrypted copy of the blueprint using the reconstructed shared secret to obtain the blueprint; (c) updating operation of the at least one data processing system using the blueprint to obtain an updated data processing system; and (d) providing computer implemented services using the updated data processing system.

The method may further include, before identifying an occurrence of a blueprint use event, (i) identifying the shared secret usable in encrypting the blueprint; (ii) identifying the blueprint security standard for the blueprint; (iii) encrypting the blueprint using the shared secret to obtain the encrypted copy of the blueprint; (iv) obtaining, using at least the shared secret and based on at least the blueprint security standard for the encrypted copy of the blueprint, the shares of the shared secret; (v) distributing the shares of the shared secret to the stakeholder devices for retention; and (vi) limiting access to the shared secret so that the shared secret can only be obtained by using at least the sufficient quantity of the shares of the shared secret.

The shares may be portions of the shared secret, the shares being based on a division of the shared secret, and the shares being managed by the stakeholder devices.

The sufficient quantity of the shares of the shared secret may be a threshold number of the shares that is less than a total number of the shares.

The blueprint security standard may define the threshold number of the shares.

Identifying the occurrence of the blueprint use event with respect to the at least one data processing system of the deployment may include obtaining, from a manager associated with the deployment, a request to update operation of the at least one data processing system of the deployment using the blueprint.

The manager may not have access to any of the shares.

Generating the number of the requests for the access to the shares of the shared secret may include (i) obtaining, from the blueprint security standard, a number for a quantity of the sufficient quantity and (ii) generating, based on the number for the quantity, the number of requests for the access to the shares of the shared secret.

Updating the operation of the at least one data processing system using the blueprint may include modifying, based on a goal state indicated by the blueprint and for the at least one data processing system, the operation of the at least one data processing system to move the at least one data processing system toward conformance with the goal state.

Providing the computer implemented services using the updated data processing system may include initiating at least one action by at least one selected from a group consisting of (a) a first application installed on the at least one data processing system during the modifying, and (b) a first application hosted by the at least one data processing system that was configured during the modifying.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, a blueprint may be deployed to a data processing system in a deployment. The blueprint may include how components and processes manage data that is ingested, processed, stored and accessed, how the data processing system is monitored and maintained, etc.

However, if a blueprint for the data processing system is misconfigured, then the data processing system may not operate properly. If the data processing system is not operating properly, then a provisioning of computer implemented services by the data processing system may be adversely impacted.

In general, embodiments disclosed here relate to systems and methods for managing operation of a deployment. The operation may be managed by enforcing a collaborative approach for use of blueprints. The collaborative approach may include permitting use of blueprints by stakeholders of the blueprint. The stakeholders may include individuals who have vested interest in the operation of a data processing system that may be updated by the blueprint.

To employ the collaborative approach by the stakeholders, the blueprints may be secured. The blueprints may be secured by encrypting the blueprints with secret keys to obtain encrypted blueprints. After being used for encrypting of blueprints, the secret keys may be divided into a number of shares. Each share may be a portion of the secret key. Each share may be provided to a corresponding stakeholder for management. For example, a share may be stored on a stakeholder device through which the stakeholder may manage use of the share. The stakeholder device may be a data processing system managed by a stakeholder.

In the encrypted blueprint, a sufficient quantity may be written to a blueprint security standard in the blueprint before encryption of the blueprint. The sufficient quantity may include a number of the shares of the secret key that is less than the number of shares and that may be combined or otherwise used to obtain a copy of the secret key.

When a request is made to use the blueprint to a data processing system, an encrypted copy of the blueprint may first need to be decrypted for it to be used. To facilitate decryption of the blueprint, a request may be made to the stakeholders for the sufficient quantity of the shares. However, stakeholders are not required to provide their respective shares, and may elect not to do so if they believe that use of the blueprint is inappropriate. Thus, by requiring consensus for decryption of blueprints, the likelihood of undesirable use of blueprints may be reduced.

Once the sufficient quantity of the shares is received from at least a portion of the stakeholder devices, the sufficient quantity of the shares may be used to generate the secret key. The sufficient quantity of the shares may be used by combining or otherwise using the sufficient quantity of the shares to obtain the secret key previously used to encrypt the blueprint.

Once the secret key is reconstructed, the secret key may be used to decrypt the blueprint. The secret key may be used by ingesting into a decryption algorithm along with the encrypted blueprint. From decryption algorithm may decrypt the encrypted blueprint to recover the blueprint may be obtained. The blueprint may then be used to update operation of a data processing system of the deployment.

To provide the above noted functionality, the system may include deployment 100, edge management system 104, and/or stakeholder devices 106. Each of these components is discussed below.

Deployment 100 may include edge orchestrator 100A and any number of edge device 100B-100N.

Edge orchestrator 100A may manage operation of edge device 100B-100N. Edge orchestrator 100A may manage the operation by (i) assigning and/or monitoring tasks of edge device 100B-100N, (ii) sending updates to edge device 100B-100N, (iii) facilitating communication between edge device 100B-100N, etc.

Edge device 100B-100N may provide desired computer implemented services. To provide desired computer implemented services, edge devices 100B-100N may be modified (e.g., reconfigured, installation/removal of software, etc.) using blueprints.

To modify edge devices 100B-100N, the blueprints may be obtained by edge orchestrator 100A, and edge device 100B-100N may be updated by edge orchestrator 100A based on the blueprints. The blueprints may include a list of software, components and processes manage data that is ingested, processed, stored and accessed, how the data processing system is monitored and maintained, etc. Edge orchestrator 100A may receive the blueprint from edge management system 104.

Edge management system 104 may secure and deploy blueprints to deployment 100. Edge management system 104 may secure deployments by (i) receiving blueprints after creation of the blueprints, (ii) encrypting a blueprint of the blueprints with a secret key to generate an encrypted blueprint, (iii) storing the encrypted blueprint in a blueprint repository, (iv) retrieving, upon a request to deploy the blueprint, the encrypted blueprint from the blueprint repository, and (v) decrypting the encrypted blueprint to generate the blueprint. Edge management system 104 may encrypt the blueprint by using an encryption method with a secret key to generate the encrypted blueprint. The secret key may be a symmetric cryptographic key. Afterwards, edge management system 104 may store the encrypted blueprint in the blueprint repository. Further, edge management system 104 may divide the secret key into shares and may dispose of the secret key. The shares may be distributed to stakeholder devices 106.

After edge management system 104 receives a request to deploy the blueprint, edge management system 104 may retrieve the encrypted blueprint from the blueprint repository. Edge management system 104 may send a request to stakeholder devices 106 for a sufficient quantity of the shares. The sufficient quantity may be a number of the shares that can be combined to generate the secret key. Edge management system 104 may have retrieved the number for the sufficient quantity from a blueprint security standard of the blueprint before encrypting the blueprint. Edge management system 104 may receive a number of the shares from stakeholder devices 106. If the number is greater than or equal to the sufficient quantity, then the secret key may be regenerated. Otherwise, if the number is less than the sufficient quantity, then the secret key may not be regenerated.

If the secret key is regenerated, then the encrypted blueprint may be decrypted with the secret key. By decrypting the encrypted blueprint, the blueprint may be obtained. The blueprint may be transferred to deployment 100.

Stakeholder devices 106 may receive the shares of the secret key for decryption of the blueprint from edge management system 104. A stakeholder device of stakeholder devices 106 may receive and store at least one share of the shares. When a request is received from edge management system 104, a stakeholder device of stakeholder devices 106 may transfer the at least one share to edge management system 104. By transferring the at least one share to edge management system 104, stakeholder device 106 may approve the request from edge management system 104.

While providing their functionality, any of deployment 100, edge management system 104, and stakeholder devices 106 may perform all, or a portion, of the interaction diagrams and methods shown in FIGS. 2A-3C.

Any of (and/or components thereof) deployment 100, edge management system 104, and stakeholder devices 106 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the Internet protocol).

While illustrated in FIG. 1 as including a limited number of specific components, a system in accordance with an embodiment may include fewer, additional, and/or different components than those components illustrated therein.

To further clarify embodiments disclosed herein, interactions diagrams in accordance with an embodiment are shown in FIGS. 2A-2D. These interactions diagrams may illustrate how data may be obtained and used within the system of FIG. 2A-2D.

In the interaction diagrams, processes performed by and interactions between components of a system in accordance with an embodiment are shown. In the diagrams, components of the system are illustrated using a first set of shapes (e.g., 104, 106, etc.), located towards the top of each figure. Lines descend from these shapes. Processes performed by the components of the system are illustrated using a second set of shapes (e.g., 200, 204, etc.) superimposed over these lines. Interactions (e.g., communication, data transmissions, etc.) between the components of the system are illustrated using a third set of shapes (e.g., 210, 224, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 210 may occur prior to the interaction labeled as 224. However, it will be appreciated that the processes and interactions may be performed in different orders, any may be omitted, and other processes or interactions may be performed without departing from embodiments disclosed herein.

Figure 2A:
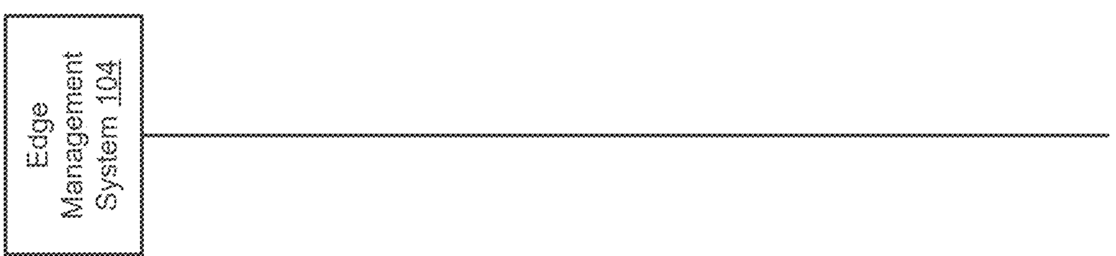
FIGS. 2A-2D show data flow diagrams illustrating operation of a system in accordance with an embodiment.
Figure 2A:
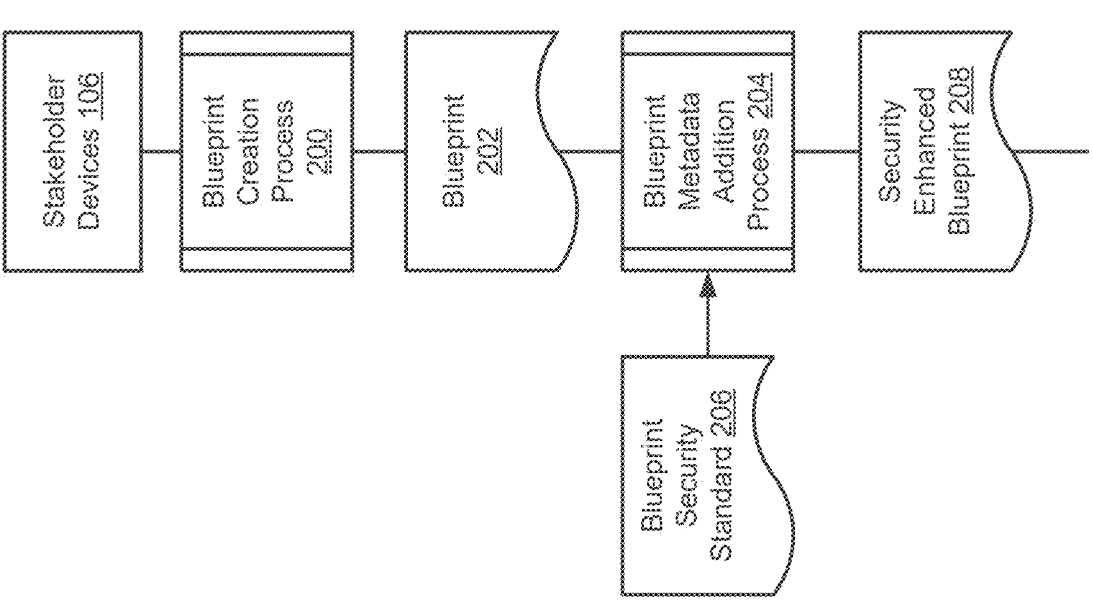

Turning to FIG. 2A, a first interaction diagram in accordance with an embodiment is shown. The first interaction diagram may illustrate processes and interactions that may occur during setting a blueprint security standard as metadata for a blueprint.

To set the blueprint security standard as the metadata for the blueprint, blueprint creation process 200 may be performed. During blueprint creation process 200, requirements of the blueprint may be obtained. The requirements of the blueprint may be obtained by identifying stakeholders' requirements for a data processing system, The stakeholders' requirements may include (i) measures to secure data from unauthorized access, (ii) systems that maintain reliability with minimal downtime in an event of a system failure, (iii) systems that ingest updates for ease of maintenance, (iv) resources that scale easily based on demand by an administrator, etc.

Once the stakeholder's requirements have been identified, the blueprint may be designed. The blueprint may be designed by (i) defining the system architecture (data ingestion, flow, and storage, processing components, etc.), (ii) defining components (data sources, databases, analysis tools, user interfaces, etc.), (iii) integration (inclusion with existing systems), etc.

Finally, after (i) using the development plan to generate a blueprint, (ii) performing testing (unit testing, integration testing, system testing, etc.) with the blueprint, and (iii) documenting a design, source code, etc. of the blueprint, blueprint 202 may be generated.

Blueprint 202 may include (i) a configuration of main components of the data processing system, (ii) how the components communicate, (iii) how application programming interfaces used by the components transfer data between the components, (iv) security controls of the data processing system for the data, (v) storage solutions for the data, (iv) plans for scaling when the system architecture is used by more than one data processing system, etc.

Along with documenting the design of the blueprint, blueprint metadata addition process 204 may be performed. During blueprint metadata addition process 204, metadata may be included with the blueprint. The metadata may include blueprint security standard 206. Blueprint security standard 206 may include (i) encryption standards (advanced encryption standard, triple data encryption standard, blowfish, etc., (ii) access policies, (iii) procedures for incident responses, etc. Access policies may include rules for access restrictions. The rules may be role-based (administrator, end user, etc.), time-based (access permitted at defined time periods), separation of duties (e.g., a first user may be allowed to only write data and a second user may only be allowed to read the data). The procedures for the incident responses may include root-cause analysis, removal of malicious artifacts, system hardening, etc.

With the encryption standards of blueprint security standard 206, a value for a sufficient quantity of a secret key may be included in the metadata. The value for the sufficient quantity may be a minimum number of shares of the secret key that are needed to generate the secret key. For example, the blueprint may be encrypted with a secret key to generate an encrypted blueprint. The secret key may be a symmetric cryptographic key with which to encrypt the blueprint and decrypt the encrypted blueprint. After encryption of the blueprint, the secret key may be divided into the shares and the secret key may be discarded. The sufficient quantity of the shares of the secret key may be used generate the secret key. From blueprint security standard 206, security enhanced blueprint 208 may be generated. Security enhanced blueprint 208 may include the value of the sufficient quantity. When security enhanced blueprint 208 is encrypted with a secret key, the value of the sufficient quantity may enhance security of the blueprint once the secret key is discarded. The value may enhance the security by using a minimum number of shares necessary to generate the secret key. Until the minimum number of shares are collected, the secret key may not be generated and the security enhanced blueprint 208 may remain encrypted.

While the interaction diagram is illustrated with stakeholder devices 106, any other device and/or individual may perform processes and/or produce data structures shown in FIG. 2A. Therefore, the processes may not be performed only by stakeholder devices 106. Further, the data structures may not be generated only by stakeholder devices 106.

Thus, via the interaction illustrated in FIG. 2A, a system in accordance with an embodiment may set the blueprint security standard as the metadata for the blueprint. Consequently, a deployment (e.g., 100) may be more likely to be able to provide desired computer implemented services by establishing a blueprint security standard after the blueprint has been developed.

Figure 2B:
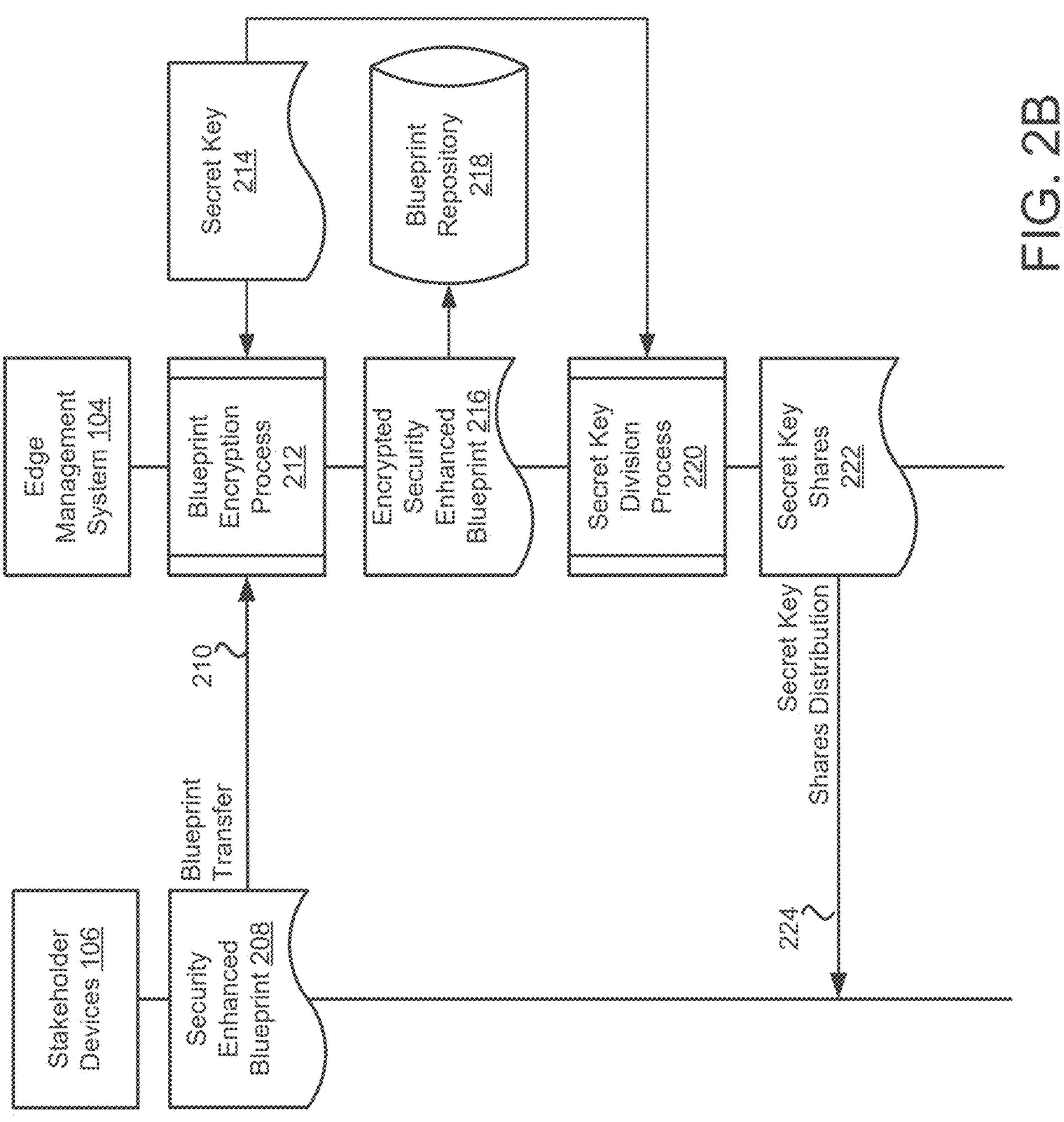

Turning to FIG. 2B, a second interaction diagram in accordance with an embodiment is shown. The second interaction diagram may illustrate processes and interactions that may occur during distributing of shares of a secret key for an encrypted blueprint to stakeholder devices.

To distribute the shares of the secret key, at interaction 210, security enhanced blueprint 208 may be transferred to edge management system 104. Security enhanced blueprint 208 may be transferred by shared memory, data streams, message queues, etc.

Once security enhanced blueprint 208 is transferred, blueprint encryption process 212 may be performed. During blueprint encryption process 212, security enhanced blueprint 208 may be encrypted. Security enhanced blueprint 208 using a cryptographic method, such as symmetric encryption, with secret key 214. Secret key 214 may be a symmetric cryptographic key. A symmetric cryptographic key may be used for encryption and/or decryption. Cryptographic methods may include advanced encryption standard, data encryption standard, triple data encryption standard, etc.

As a result of blueprint encryption process 212, encrypted security enhanced blueprint 216 may be generated. Encrypted security enhanced blueprint 216 may include ciphertext of documentation of a system architecture for a data processing system. In addition, the ciphertext of metadata of security enhanced blueprint 208 may be included.

Until a request for deployment of encrypted security enhanced blueprint 216 has been received, encrypted security enhanced blueprint 216 may be stored in blueprint repository 218. Blueprint repository 218 may include at least one blueprint that is encrypted and includes security enhancements written in metadata of the blueprint.

After encrypted security enhanced blueprint 216 has been stored in blueprint repository 218, secret key division process 220 may be performed. During secret key division process 220, secret key 214 may be divided. Secret key 214 may be divided by generating shares from the secret key. Secret key shares 222 may be generated during secret key division process 220.

At interaction 224, secret key shares 222 may be distributed to stakeholder devices 106. Secret key shares 222 may be distributed by shared memory, data streams, message queues, etc. At least one share of secret key shares 222 may be received by a stakeholder device of stakeholder devices. A first stakeholder device may be aware of the at least one share and may not be aware of other shares that may be stored by a second stakeholder device. Further, at long as a sufficient quantity of the shares, specified in metadata in encrypted security enhanced blueprint 216, is not acquired, secret key 214 may not be generated. If secret key 214 is not generated, encrypted security enhanced blueprint 216 may remain encrypted.

Thus, via the interaction illustrated in FIG. 2B, a system in accordance with an embodiment may distribute the shares of the secret key for the encrypted blueprint to the stakeholder devices. Consequently, a deployment (e.g., 100) may be more likely to be able to provide desired computer implemented services by securing the secret key used to encrypt and/or decrypt the encrypted blueprint.

Figure 2C:
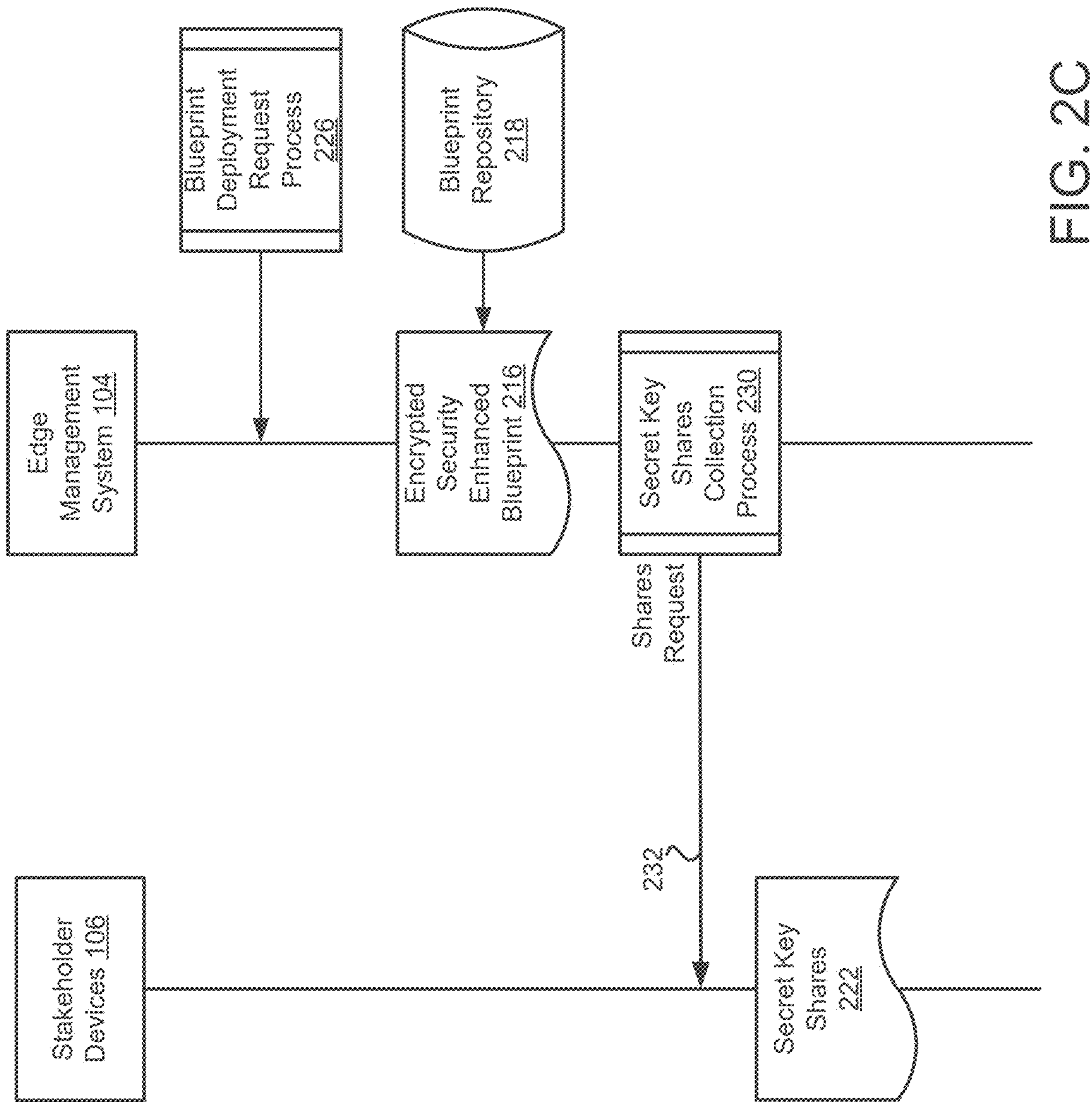

Turning to FIG. 2C, a third interaction diagram in accordance with an embodiment is shown. The third interaction diagram may illustrate processes and interactions that may occur during requesting of shares of a secret key for an encrypted blueprint from stakeholder devices.

To request the shares of the secret key from the stakeholder devices, blueprint deployment request process 226 may be performed. During blueprint deployment request process 226, a request may be made to deploy encrypted security enhanced blueprint 216 to at least one data processing system. The request may be made by (i) scheduling a deployment on at least one data processing system, (ii) ensuring a production environment on the at least one data processing system is ready for the deployment, and (iii) decrypting encrypted security enhanced blueprint 216 to generate blueprint 202. Ensuring the production environment is ready may include preparing hardware, software, and/or network configurations to be used by blueprint 202.

To decrypt encrypted security enhanced blueprint 216, encrypted security enhanced blueprint 216 may be obtained from blueprint repository 218. Encrypted security enhanced blueprint 216 may be obtained by (i) performing a search in blueprint repository 218, (ii) navigating to a directory where the search shows that the blueprint repository 218 is stored, and (iii) retrieving encrypted security enhanced blueprint 216 from blueprint repository 218.

Once encrypted security enhanced blueprint 216 has been retrieved, secret key shares collection process 230 may be performed. During secret key shares collection process 230, requests may be generated to send to stakeholder devices 106. The requests may be generated by (i) obtaining a list, from interaction 224 from FIG. 2B, that includes each device of stakeholder devices 106 that received secret key shares 222, and (ii) generating a request for each of the device of stakeholder devices 106.

At interaction 232, using the communication protocol, any number of the requests may be sent to stakeholder devices 106 for corresponding shares of a secret. The request may include information regarding that which is requested (e.g., a share), a host device, authorization for the request, etc. After the request is received by a stakeholder device of stakeholder devices 106, a response may be generated. The response may include details about content of the file. For example, a response for a request of a share may include (i) a data type, (ii) a data description, including a file name and/or metadata, and/or (iii) the data.

From the request, a stakeholder device of stakeholder devices 106 may retrieve a share of secret key shares 222. The share may be retrieved from a file system, a database, shared memory, hardware secret management component (e.g., a trust platform module), etc. The share may be retrieved by file handling, database queries, key-based memory access, and/or other processes.

Thus, via the interaction illustrated in FIG. 2C, a system in accordance with an embodiment may request the shares of a secret key for an encrypted blueprint from stakeholder devices. Consequently, a deployment (e.g., 100) may be more likely to be able to provide desired computer implemented services by identifying an occurrence of a blueprint use event through a request of the shares.

Figure 2D:
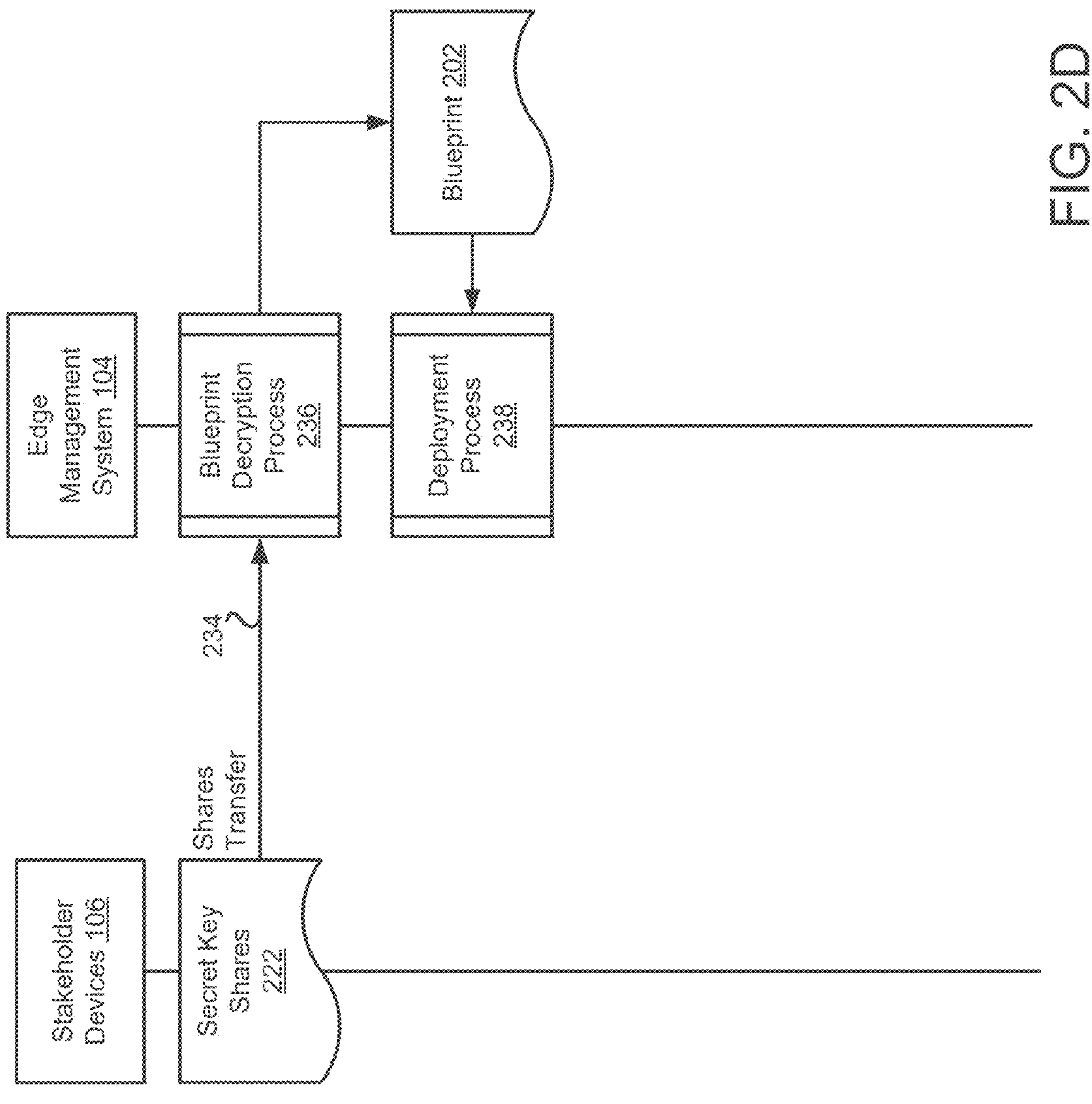

Turning to FIG. 2D, a fourth interaction diagram in accordance with an embodiment is shown. The fourth interaction diagram may illustrate processes and interactions that may occur during deploying of a blueprint.

To deploy the blueprint, at interaction 234, secret key shares 222 may be transferred to edge management system 104 (e.g., presuming that the stakeholders are convinced that a proposed use of a blueprint is appropriate). Secret key shares 222 may be transferred by shared memory, data streams, message queues, etc. Secret key shares 222 may include at least a portion of the shares. Secret key shares 222 may include at least a portion of the shares because the at least a portion of stakeholder devices 106 can include a sufficient quantity of the shares. The sufficient quantity of the shares may be used to generate secret key 214 to decrypt encrypted security enhanced blueprint 216.

However, a stakeholder devices of stakeholder devices 106 may not be required to transfer a share in interaction 234. The stakeholder device may transfer the share depending on whether the stakeholder elects to use blueprint 202 in a data processing system. The stakeholder may elect to use blueprint 202 in the data processing system based on an evaluation of blueprint 202. Dependent on the evaluation of blueprint 202, secret key shares 222 may be received by edge management system 104.

Secret key shares 222 may be received by edge management system 104 and be ingested by blueprint decryption process 236. During blueprint decryption process 236, encrypted security enhanced blueprint 216 may be decrypted to obtain blueprint 202. To obtain blueprint 202, edge management system 104 may search secret key shares 222 for a sufficient quantity of shares in secret key shares 222 such that the decryption key for the encrypted blueprint can be regenerated. A value for the sufficient quantity of the shares may be defined in blueprint security standard 206. If the sufficient quantity of the shares is present in secret key shares 222, then the sufficient quantity of the shares may be used to regenerate the secret key. Otherwise, if the sufficient quantity of the shares is not present in secret key shares 222, then the secret key may not be regenerated.

With the sufficient quantity of the shares present in secret key shares 222, secret key 214 may be generated. Secret key 214 may be generated by combining the sufficient quantity of the shares. Secret key 214 may be used to generate blueprint 202. Secret key 214 may be used by ingesting, by a cryptographic method, encrypted security enhanced blueprint 216 and secret key 214 to yield blueprint 202. The cryptographic method may include advanced encryption standard, data encryption standard, triple data encryption standard, etc.

Once blueprint 202 has been generated, deployment process 238 may be performed. During deployment process 238, a continuous integration and continuous delivery (CI/CD) deployment pipeline may be selected to automate deployment of the blueprint. Using the CI/CD deployment pipeline, blueprint 202 may be deployed to at least one data processing system. Blueprint 202 may be deployed by configuring a state of the at least one data processing system to a goal state. The at least one data processing system may be monitored to ensure all components of the goal state are running correctly.

Thus, via the interaction illustrated in FIG. 2D, a system in accordance with an embodiment may deploy of the blueprint. Consequently, a deployment (e.g., 100) may be more likely to be able to provide desired computer implemented services using a sufficient quantity of shares from stakeholder devices to generate a secret key. The secret key may be used to decrypt the blueprint which is then deployed to the at least one data processing system.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
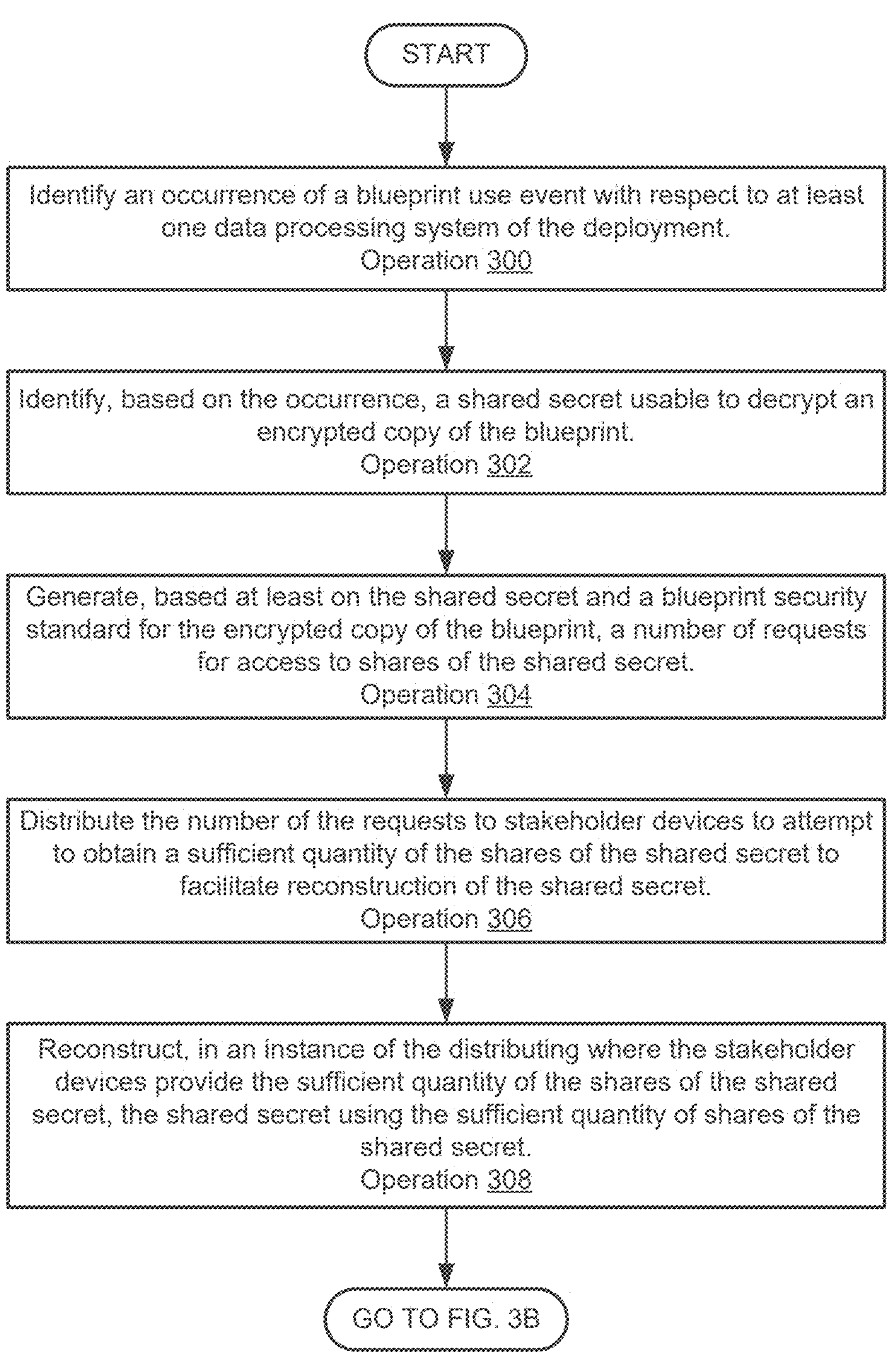
FIGS. 3A-3C show flow diagrams illustrating at least one method in accordance with an embodiment.
Figure 3B:
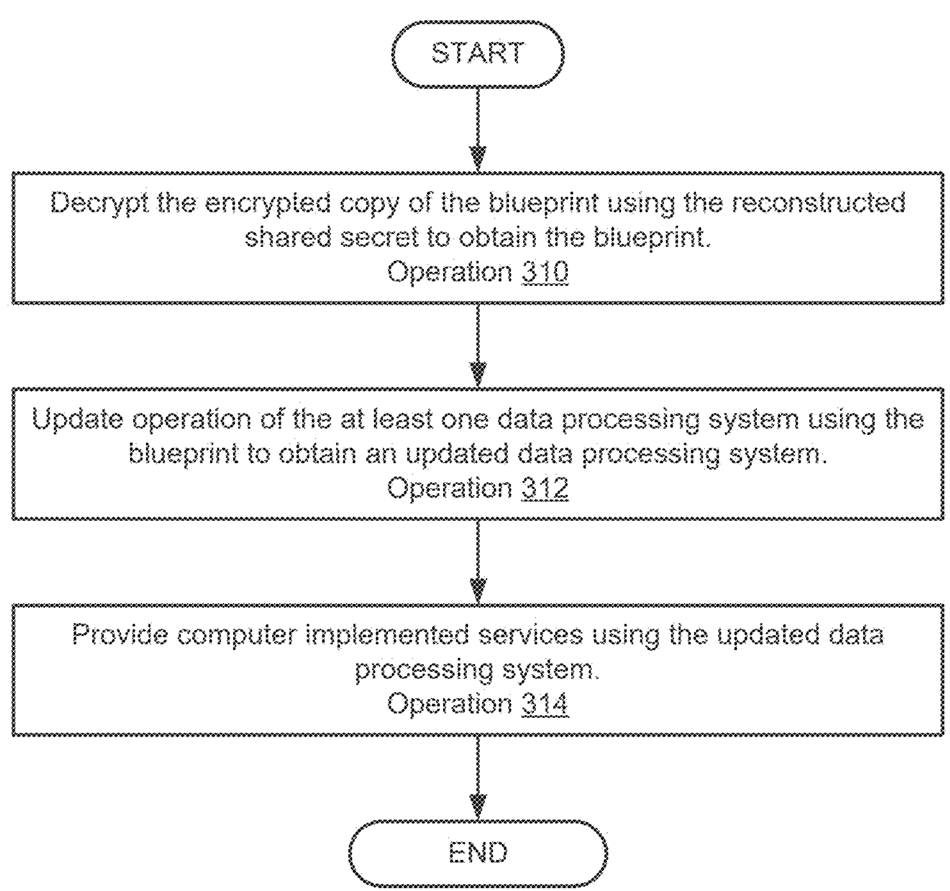
Figure 3C:
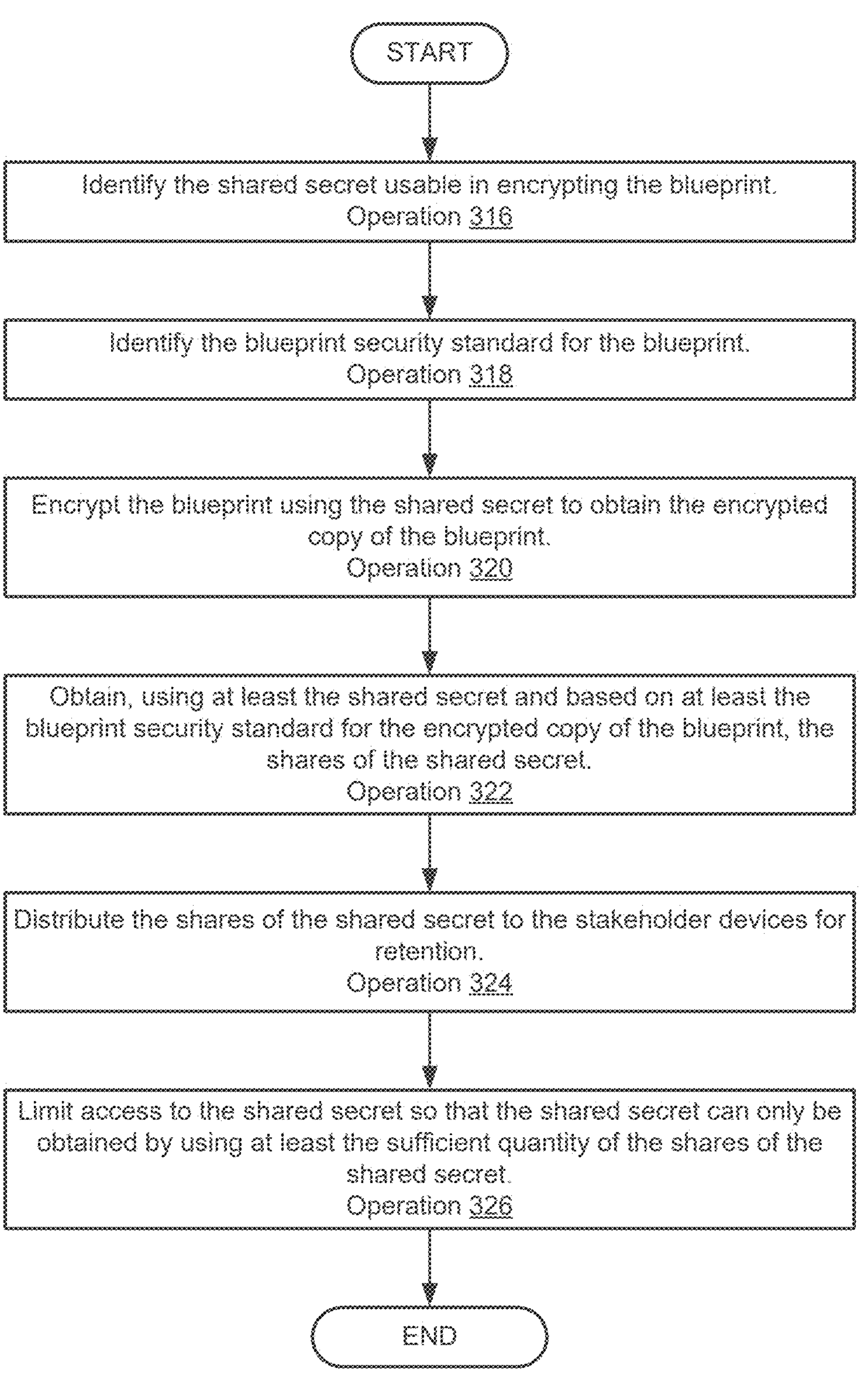

As discussed above, the components of FIG. 1 may perform various methods to managing operation of a deployment. FIGS. 3A-3C illustrate a method that may be performed by the components of the system of FIG. 1. In the diagram discussed below and shown in FIGS. 3A-3C, any of the operations may be repeated, performed in different orders, and/or performed in parallel with or in a partially overlapping in time manner with other operations.

Turning to FIG. 3A, a flow diagram illustrating a method of managing operation of a deployment in accordance with an embodiment is shown. The method may be performed, for example, by any of the components of the system of FIG. 1, and/or other components not shown therein.

At operation 300, an occurrence of a blueprint use event may be identified with respect to at least one data processing system of the deployment. The occurrence may be identified by obtaining, from a manager associated with the deployment, a request to update operation of the at least one data processing system of the deployment using the blueprint. The request may be obtained by receiving the request from the manager.

At operation 302, a shared secret may be identified, based on the occurrence, usable to decrypt an encrypted copy of the blueprint. The shared secret may be identified by (i) identifying a cryptographic method used to decrypt the encrypted copy of the blueprint and (ii) identifying a type of secret key that can be ingested by the cryptographic method. The types of secret keys may include an integer, a bitstring, an alphanumeric string, etc.

At operation 304, a number of requests for access to shares of the shared secret may be generated based at least on the shared secret and a blueprint security standard for the encrypted copy of the blueprint. The number of the requests may be generated by (i) obtaining, from the blueprint security standard, a number for a quantity of the sufficient quantity and (ii) generating, based on the number for the quantity, the number of requests for the access to the shares of the shared secret.

A number for a quantity of the sufficient quantity may be obtained by reading the number for the quantity in the blueprint security standard in metadata of the blueprint. The number of requests may be generated by creating data requests using a communication protocol. Examples of communication protocols may include hypertext transfer protocol (HTTP), file transfer protocol (FTP), representational state transfer application programming interface (REST API), etc.

At operation 306, the number of the requests to stakeholder devices may be distributed to attempt to obtain a sufficient quantity of the shares of the shared secret to facilitate reconstruction of the shared secret. The number of the requests may be distributed by sending the data requests to the stakeholder devices using the communication protocol.

At operation 308, the shared secret may be reconstructed, in an instance of the distributing where the stakeholder devices provide the sufficient quantity of the shares of the shared secret, using the sufficient quantity of shares of the shared secret. The shared secret may be reconstructed by combining the sufficient quantity of the shares to generate the shared secret.

Continuing to FIG. 3B, at operation 310, the encrypted copy of the blueprint may be decrypted using the reconstructed shared secret to obtain the blueprint. The encrypted copy of the blueprint may be decrypted by ingesting, by the cryptographic method, the shared secret and the encrypted copy of the blueprint to generate the blueprint.

At operation 312, the operation of the at least one data processing system may be updated using the blueprint to obtain an updated data processing system. The operation may be updated by modifying, based on a goal state indicated by the blueprint and for the at least one data processing system, the operation of the at least one data processing system to move the at least one data processing system toward conformance with the goal state. The operation of the at least one data processing system may be modified by configuring components of the at least one data processing system to have a state that matches the goal state indicated by the blueprint.

At operation 314, computer implemented services may be provided using the updated data processing system. The computer implemented services may be provided by performing, by the at least one data processing system, operations using the components that have the goal state indicated by the blueprint.

The method may end following operation 314.

Thus, via the method shown in FIGS. 3A-3B, embodiments herein may likely improve a likelihood of managing operation of a deployment. By improving the likelihood of managing operation of a deployment, the data processing systems may be more likely to provide desirable computer implemented services by, for example, facilitating deployment of a blueprint based responses that include a sufficient quantity of shares of a shared secret from stakeholder devices, using the sufficient quantity of the shares to regenerate the shared secret for decrypting the blueprint, etc.

Turning to FIG. 3C, a flow diagram illustrating a method of managing operation of a deployment in accordance with an embodiment is shown. The method may be performed, for example, by any of the components of the system of FIG. 1, and/or other components not shown therein. The method of FIG. 3C may be performed before the method of FIGS. 3A-3B.

At operation 316, the shared secret may be identified that is usable in encrypting the blueprint. The shared secret may be identified by identifying the cryptographic method used to encrypt the blueprint and (ii) identifying a type of secret key that can be ingested by the cryptographic method. The types of secret keys may include an integer, a bitstring, an alphanumeric string, etc.

At operation 318, the blueprint security standard may be identified for the blueprint. The blueprint security standard may be identified by identifying the sufficient quantity of the shares of the shared secret used to encrypt the blueprint. The sufficient quantity may be a threshold number of the shares that is less than a total number of the shares.

At operation 320, the blueprint may be encrypted using the shared secret to obtain the encrypted copy of the blueprint. The blueprint may be encrypted by ingesting, by the cryptographic method, the shared secret and the blueprint to generate the encrypted copy of the blueprint.

At operation 322, the shares of the shared secret may be obtained by using at least the shared secret and based on at least the blueprint security standard for the encrypted copy of the blueprint. The shared secret, based on at least the blueprint security standard, may be used by dividing the shared secret into at least the sufficient quantity of the shares. The sufficient quantity of the shares may be specified in the blueprint security standard.

At operation 324, the shares of the shared secret may be distributed to the stakeholder devices for retention. The shares of the shared secret may be distributed by transferring at least a share of the shares to a stakeholder device of the stakeholder devices. A transfer of the at least a share may be facilitated using requests using a communication protocol. Examples of communication protocols may include hypertext transfer protocol (HTTP), file transfer protocol (FTP), representational state transfer application programming interface (REST API), etc.

At operation 326, access to the shared secret may be limited so that the shared secret can only be obtained by using at least the sufficient quantity of the shares of the shared secret. The access may be limited by discarding the shared secret. To regain access to the shared secret, the sufficient quantity of the shares may need to be combined to generate the shared secret.

Thus, via the method shown in FIG. 3C, embodiments herein may likely improve a likelihood of managing operation of a deployment. By improving the likelihood of managing operation of a deployment, the data processing systems may be more likely to provide desirable computer implemented services by, for example, securing the blueprint with the shared secret to which the access is limited, storing the shares of the shared secret in stakeholder devices, etc.

Figure 4:
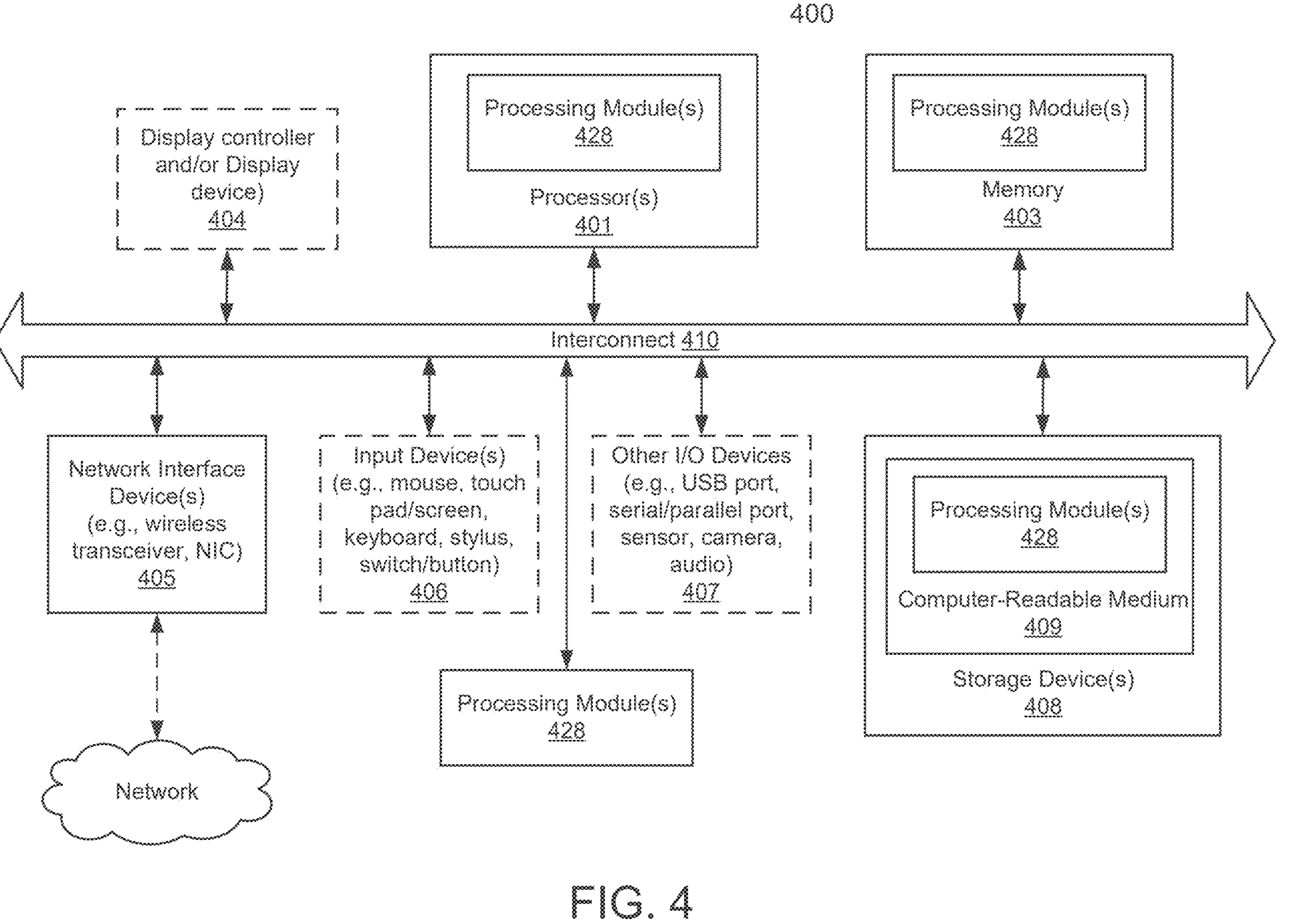
FIG. 4 shows a block diagram illustrating a data processing system in accordance with an embodiment.

Any of the components illustrated in FIGS. 1-2D may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a deployment, the method comprising:

identifying an occurrence of a blueprint use event with respect to at least one data processing system of the deployment;

based on the occurrence:

identifying a shared secret usable to decrypt an encrypted copy of a blueprint associated with the blueprint use event;

generating, based at least on the shared secret and a blueprint security standard for the encrypted copy of the blueprint, a number of requests for access to shares of the shared secret;

distributing the number of the requests to stakeholder devices to attempt to obtain a sufficient quantity of the shares of the shared secret to facilitate reconstruction of the shared secret, the shares being portions of the shared secret, the shares being based on a division of the shared secret, the shares being managed by the stakeholder devices, and the sufficient quantity of the shares of the shared secret is a threshold number of the shares that is less than a total number of the shares;

in an instance of the distributing where the stakeholder devices provide the sufficient quantity of the shares of the shared secret:

reconstructing the shared secret using the sufficient quantity of shares of the shared secret;

decrypting the encrypted copy of the blueprint using the reconstructed shared secret to obtain the blueprint;

updating operation of the at least one data processing system using the blueprint to obtain an updated data processing system; and providing computer implemented services using the updated data processing system.

2. The method of claim 1, further comprising:

before identifying the occurrence of the blueprint use event:

identifying the shared secret usable in encrypting the blueprint;

identifying the blueprint security standard for the blueprint;

encrypting the blueprint using the shared secret to obtain the encrypted copy of the blueprint;

obtaining, using at least the shared secret and based on at least the blueprint security standard for the encrypted copy of the blueprint, the shares of the shared secret;

distributing the shares of the shared secret to the stakeholder devices for retention; and limiting access to the shared secret so that the shared secret can only be obtained by using at least the sufficient quantity of the shares of the shared secret.

3. The method of claim 1, wherein the blueprint security standard defines the threshold number of the shares.

4. The method of claim 1, wherein identifying the occurrence of the blueprint use event with respect to the at least one data processing system of the deployment comprises:

obtaining, from a manager associated with the deployment, a request to update operation of the at least one data processing system of the deployment using the blueprint.

5. The method of claim 4, wherein the manager does not have access to any of the shares when the request is obtained.

6. The method of claim 1, wherein generating the number of the requests for the access to the shares of the shared secret comprises:

obtaining, from the blueprint security standard, a number for a quantity of the sufficient quantity; and generating, based on the number for the quantity, the number of requests for the access to the shares of the shared secret.

7. The method of claim 1, wherein updating the operation of the at least one data processing system using the blueprint comprises:

modifying, based on a goal state indicated by the blueprint and for the at least one data processing system, the operation of the at least one data processing system to move the at least one data processing system toward conformance with the goal state.

8. The method of claim 7, wherein providing the computer implemented services using the updated data processing system comprises:

initiating at least one action by at least one selected from a group consisting of:

a first application installed on the at least one data processing system during the modifying, and a first application hosted by the at least one data processing system that was configured during the modifying.

9. A non-transitory machine-readable medium having instructions stored therein, which when executed by a processor, cause the processor to perform operations for managing operation of a deployment, the operations comprising:

identifying an occurrence of a blueprint use event with respect to at least one data processing system of the deployment;

based on the occurrence:

identifying a shared secret usable to decrypt an encrypted copy of a blueprint associated with the blueprint use event;

generating, based at least on the shared secret and a blueprint security standard for the encrypted copy of the blueprint, a number of requests for access to shares of the shared secret;

distributing the number of the requests to stakeholder devices to attempt to obtain a sufficient quantity of the shares of the shared secret to facilitate reconstruction of the shared secret, the shares being portions of the shared secret, the shares being based on a division of the shared secret, the shares being managed by the stakeholder devices, and the sufficient quantity of the shares of the shared secret is a threshold number of the shares that is less than a total number of the shares;

in an instance of the distributing where the stakeholder devices provide the sufficient quantity of the shares of the shared secret:

reconstructing the shared secret using the sufficient quantity of shares of the shared secret;

decrypting the encrypted copy of the blueprint using the reconstructed shared secret to obtain the blueprint;

updating operation of the at least one data processing system using the blueprint to obtain an updated data processing system; and providing computer implemented services using the updated data processing system.

10. The non-transitory machine-readable medium of claim 9, wherein the operations further comprise:

before identifying the occurrence of the blueprint use event:

identifying the shared secret usable in encrypting the blueprint;

identifying the blueprint security standard for the blueprint;

encrypting the blueprint using the shared secret to obtain the encrypted copy of the blueprint;

obtaining, using at least the shared secret and based on at least the blueprint security standard for the encrypted copy of the blueprint, the shares of the shared secret;

distributing the shares of the shared secret to the stakeholder devices for retention; and limiting access to the shared secret so that the shared secret can only be obtained by using at least the sufficient quantity of the shares of the shared secret.

11. The non-transitory machine-readable medium of claim 9, wherein the blueprint security standard defines the threshold number of the shares.

12. The non-transitory machine-readable medium of claim 9, wherein identifying the occurrence of the blueprint use event with respect to the at least one data processing system of the deployment comprises:

obtaining, from a manager associated with the deployment, a request to update operation of the at least one data processing system of the deployment using the blueprint.

13. The non-transitory machine-readable medium of claim 12, wherein the manager does not have access to any of the shares when the request is obtained.

14. The non-transitory machine-readable medium of claim 9, wherein generating the number of the requests for the access to the shares of the shared secret comprises:

obtaining, from the blueprint security standard, a number for a quantity of the sufficient quantity; and generating, based on the number for the quantity, the number of requests for the access to the shares of the shared secret.

15. A system, comprising:

a processor; and a memory coupled to the processor to store instructions, which when executed by the processor, cause operations for managing operation of a deployment to be performed, the operations comprising:

identifying an occurrence of a blueprint use event with respect to at least one data processing system of the deployment;

based on the occurrence:

identifying a shared secret usable to decrypt an encrypted copy of a blueprint associated with the blueprint use event;

generating, based at least on the shared secret and a blueprint security standard for the encrypted copy of the blueprint, a number of requests for access to shares of the shared secret;

distributing the number of the requests to stakeholder devices to attempt to obtain a sufficient quantity of the shares of the shared secret to facilitate reconstruction of the shared secret, the shares being portions of the shared secret, the shares being based on a division of the shared secret, the shares being managed by the stakeholder devices, and the sufficient quantity of the shares of the shared secret is a threshold number of the shares that is less than a total number of the shares;

in an instance of the distributing where the stakeholder devices provide the sufficient quantity of the shares of the shared secret:

reconstructing the shared secret using the sufficient quantity of shares of the shared secret;

decrypting the encrypted copy of the blueprint using the reconstructed shared secret to obtain the blueprint;

updating operation of the at least one data processing system using the blueprint to obtain an updated data processing system; and providing computer implemented services using the updated data processing system.

16. The system of claim 15, wherein the operations further comprise:

before identifying the occurrence of the blueprint use event:

identifying the shared secret usable in encrypting the blueprint;

identifying the blueprint security standard for the blueprint;

encrypting the blueprint using the shared secret to obtain the encrypted copy of the blueprint;

obtaining, using at least the shared secret and based on at least the blueprint security standard for the encrypted copy of the blueprint, the shares of the shared secret;

distributing the shares of the shared secret to the stakeholder devices for retention; and limiting access to the shared secret so that the shared secret can only be obtained by using at least the sufficient quantity of the shares of the shared secret.

17. The system of claim 15, wherein the blueprint security standard defines the threshold number of the shares.

18. The system of claim 15, wherein identifying the occurrence of the blueprint use event with respect to the at least one data processing system of the deployment comprises:

obtaining, from a manager associated with the deployment, a request to update operation of the at least one data processing system of the deployment using the blueprint.

19. The system of claim 18, wherein the manager does not have access to any of the shares when the request is obtained.

20. The system of claim 15, wherein generating the number of the requests for the access to the shares of the shared secret comprises:

obtaining, from the blueprint security standard, a number for a quantity of the sufficient quantity; and generating, based on the number for the quantity, the number of requests for the access to the shares of the shared secret.

* * * * *